US006961950B2

(12) United States Patent
Kerfeld et al.

(10) Patent No.: US 6,961,950 B2
(45) Date of Patent: Nov. 1, 2005

(54) VARIABLE THICKNESS STAMPER FOR CREATION OF FLAT MOLDED SUBSTRATES

(75) Inventors: Donald J. Kerfeld, St. Paul, MN (US); Douglas J. Chaput, Mahtomedi, MN (US); Jathan D. Edwards, Afton, MN (US); Chad R. Sandstrom, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 423 days.

(21) Appl. No.: 09/946,011

(22) Filed: Sep. 4, 2001

(65) Prior Publication Data
US 2003/0043731 A1 Mar. 6, 2003

(51) Int. Cl.⁷ ............................................. G11B 7/24
(52) U.S. Cl. ................................................ 720/718
(58) Field of Search ......................... 369/280, 283, 369/288, 275.2, 13.49; 29/604; 428/141, 428/64.4; 720/718

(56) References Cited

U.S. PATENT DOCUMENTS

| 4,992,336 A | | 2/1991 | Yamamoto et al. | |
|---|---|---|---|---|
| 5,079,758 A | * | 1/1992 | Clark | 369/284 |
| 5,233,597 A | | 8/1993 | Nakayama et al. | |
| 5,326,240 A | | 7/1994 | Kudo et al. | |
| 5,458,985 A | | 10/1995 | Isono et al. | |
| 5,460,763 A | | 10/1995 | Asai | |
| 5,470,627 A | | 11/1995 | Lee et al. | |
| 5,476,700 A | | 12/1995 | Asai et al. | |
| 5,487,926 A | | 1/1996 | Kuribayashi et al. | |
| 5,580,632 A | * | 12/1996 | Ohkawa et al. | 428/64.1 |
| 5,582,891 A | | 12/1996 | Murakami et al. | |
| 5,597,613 A | | 1/1997 | Galarneau et al. | |
| 5,598,398 A | * | 1/1997 | Best et al. | 369/272 |
| 5,675,570 A | | 10/1997 | Ohira et al. | |
| 5,827,593 A | | 10/1998 | Maruyama et al. | |
| 5,893,998 A | | 4/1999 | Kelley et al. | |
| 6,108,297 A | | 8/2000 | Ohta et al. | |
| 6,246,656 B1 | * | 6/2001 | Kawakubo et al. | 369/112.23 |
| 2002/0048691 A1 | * | 4/2002 | Davis et al. | 428/694 ML |
| 2002/0081460 A1 | * | 6/2002 | Feist et al. | 428/694 ST |

FOREIGN PATENT DOCUMENTS

| EP | 0 386 971 | 9/1990 |
|---|---|---|
| JP | 63-74618 | 4/1988 |
| JP | 2-134219 | 5/1990 |
| JP | 5-278088 | 10/1993 |
| JP | 9-295319 | 11/1997 |
| JP | 10-230524 | 9/1998 |
| WO | WO 98/47143 | 10/1998 |
| WO | WO 00/74919 A1 | 12/2000 |

* cited by examiner

Primary Examiner—William Korzuch
Assistant Examiner—Mark Blouin
(74) Attorney, Agent, or Firm—Eric D. Levinson

(57) ABSTRACT

The invention is directed toward techniques for creating molded substrates for use in various different data storage media. The molded substrates have improved thickness profiles that can improve media quality, and in some cases facilitate higher data storage densities. In many cases, the improved thickness profile is a thickness profile that has improved flatness. Mechanical flatness or optical flatness can be achieved. In particular, optical flatness is desirable for substrates used in holographic data storage media having a sandwiched construction.

7 Claims, 11 Drawing Sheets

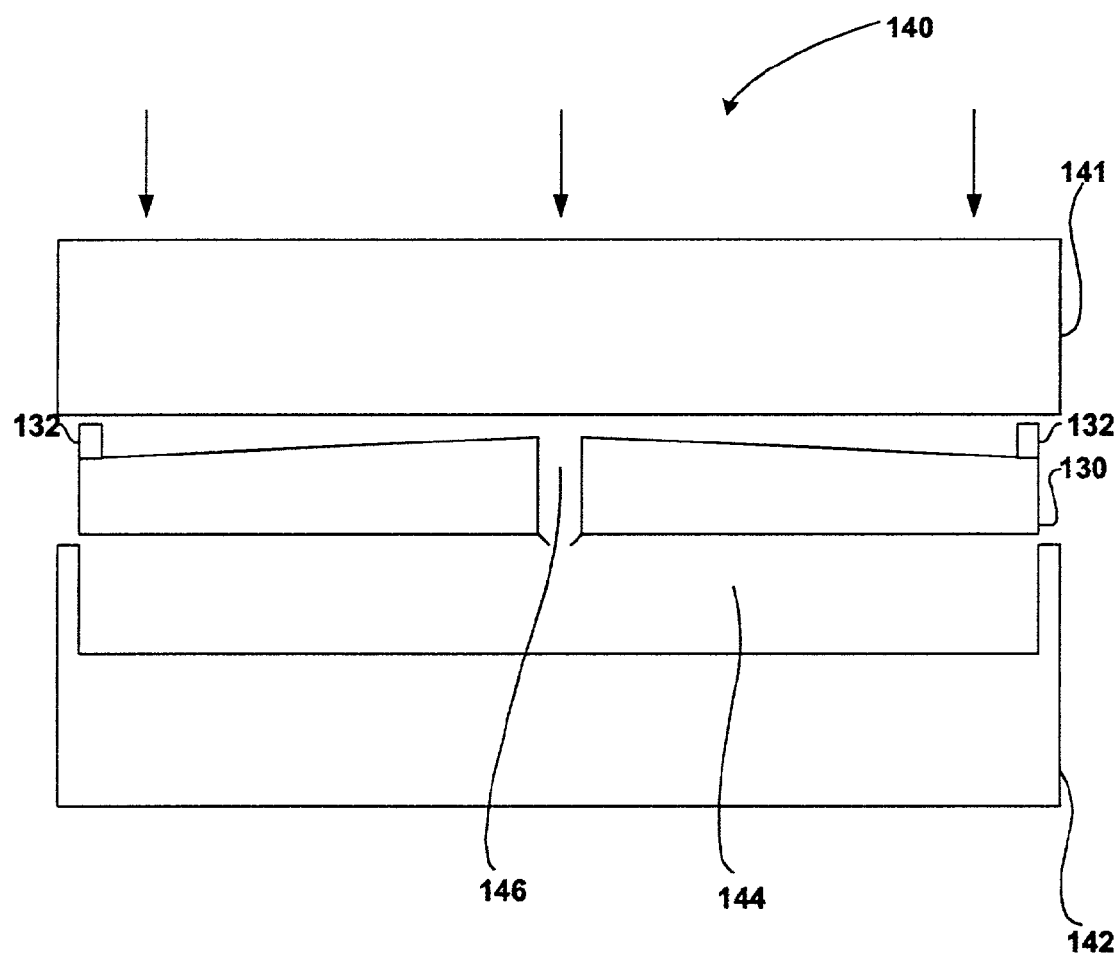

VARIABLE THICKNESS STAMPER FOR CREATION OF FLAT MOLDED SUBSTRATES

TECHNICAL FIELD

The invention relates to the manufacture of data storage media substrates.

BACKGROUND OF THE INVENTION

Molded substrates are commonly used in a variety of different data storage media. For example, molded substrates can be used as optical data storage disks, or as part of holographic media or other data storage media. Optical data storage disks are widely accepted for use in storage, distribution and retrieval of large volumes of information. Optical data storage disks include, for example, audio CD (compact disc), CD-R (CD-recordable), CD-RW (CD-rewritable), CD-ROM (CD-read only memory), DVD (digital versatile disk or digital video disk) media, DVD-RAM (DVD-random access memory), and various types of rewritable media, such as magneto-optical (MO) disks and phase change optical disks.

Holographic data storage media, on the other hand, may provide higher storage density alternatives to conventional optical data storage disks. In a holographic medium, data can be stored throughout the volume of the medium rather than on the medium surface. Moreover, data can be superimposed within the same medium volume through any of a number of multiplexing methods. In this way, theoretical holographic storage densities can approach tens of terabits per cubic centimeter.

Optical data storage disk substrates can be produced by first making a master disk that has a surface pattern that represents encoded data on the master disk surface. The surface pattern, for instance, may be a collection of grooves that define master pits and master lands. The master disk is typically created by a relatively expensive mastering process.

After creating a suitable master, the master can then be used to make a stamper. The stamper has a surface pattern that is the inverse of the surface pattern encoded on the master. The stamper then can be used to mold large quantities of disk-shaped substrates in a mass production stamping process such as an injection molding process. Each substrate may contain the data and tracking information that was encoded on the master.

During a stamping process, an inverse of the surface pattern on the stamper becomes molded into each substrate, forming a collection of grooves or groove segments that define "pits" with respect to a plane referred to as the "land." Typically, the stamped side of the substrate is then coated with a reflective layer, such as a thin layer of aluminum, and in the case of a CD, followed by a protective layer of lacquer. Data tracks on an optical disk substrate can be arranged in a spiral manner relative to the disk center, or alternatively, the data also can lie in a series of concentric tracks spaced radially from the disk center.

Some holographic media have a sandwiched construction in which a recording photopolymer layer is sandwiched between two molded substrates. The substrates can be created by an injection molding process similar to that used in the creation of optical data storage disks. For some holographic media, the expensive mastering process may be avoided because surface patterns on the substrate may not be necessary. In other cases, however, holographic substrates may have surface patterns, for example, storing tracking information or the like. In those cases, the process of making a master can be used to define the tracking information on the molded holographic medium substrate.

SUMMARY

In general, the invention is directed toward techniques for creating molded substrates for use in a variety of different data storage media. The molded substrates have improved thickness profiles that can improve media quality, and in some cases facilitate higher data storage densities. In many cases, the improved thickness profile exhibits improved flatness, i.e., parallelism of the two substrate surfaces. However, the invention could be used to realize molded substrates having any desired thickness profile.

The thickness profile of molded substrates according to the invention can be made to be mechanically flat or optically flat. A mechanically flat substrate is one having a cross-sectional thickness that is substantially uniform at substantially all locations on a recording area of the medium. An optically flat substrate is a substrate wherein the cross-sectional thickness multiplied by the local index of refraction is substantially uniform at substantially all locations on the recording area of the medium. In some cases, a substrate may be both optically flat and mechanically flat, i.e., if the index of refraction does not vary across the substrate. The techniques according to the invention can be used to realize substrates that are mechanically flat or optically flat to variations on the order of one micron.

In one embodiment, the invention is directed toward optically flat substrates. In that case, the invention may comprise a molded substrate, wherein at substantially all locations on the recording area of the molded substrate a local index of refraction of the molded substrate multiplied by a cross-sectional thickness of the molded substrate is substantially constant. For example, the local index of refraction multiplied by the cross-sectional thickness of the substrate can be made equal at substantially all locations of the recording area of the medium to within a variation less than 10 microns, less than 2 microns, or even variations on the order of one micron. In particular, optically flat substrates are desirable for use in sandwiched construction holographic data storage media.

In another embodiment, the invention is directed toward mechanically flat substrates. In that case, the invention may comprise a molded substrate, wherein at substantially all locations on the recording area of the molded substrate a cross-sectional thickness of the molded substrate is substantially constant. The cross-sectional thickness of the substrate can be made constant at substantially all locations on the recording area of the medium to within a variation less than 10 microns, less than 2 microns, or even variations on the order of one micron.

In another embodiment, the invention is directed to a method comprising purposely varying a cross-sectional thickness of a molded substrate across a radial dimension such that a local index of refraction multiplied by the cross-sectional thickness is substantially constant at substantially all radial locations on the molded substrate. For example, a method may include establishing a desired thickness profile of a molded substrate and electroplating a variable thickness stamper for an injection molding tool. The stamper can then be used to create a molded substrate having the desired thickness profile.

The invention provides several advantages. Injection molded substrates can be fabricated relatively easily and at lower costs than other substrate alternatives. Flat injection molded substrates can improve media quality for a variety of different media formats including optical data storage disks, holographic media having a sandwiched construction and flyable rigid disk media. In particular, optically flat substrates may be necessary to realize effective holographic media. If the substrates are not optically flat, the ability to read holographic bit maps stored in photopolymer material sandwiched between the substrates can be compromised.

Another advantage of the techniques according to the invention relates to the design freedoms facilitated by the techniques. Although the techniques are described herein as realizing substrates having improved flatness, the techniques could also be used to realize substrates having any thickness profile. If future media require substrates having any non-conventional thickness profile, the invention may be used to realize the desired substrate.

Additional details of these and other embodiments are set forth in the accompanying drawings and the description below. Other features, objects and advantages will become apparent from the description and drawings, and from the claims.

BRIEF DESCRIPTION OF THE DRAWINGS

FIG. 1 is a top view and FIG. 2 is a cross-sectional side view.

FIG. 3 is a top view and FIGS. 4–6 are cross-sectional side views.

FIG. 14 is a cross-sectional side view of the variable thickness stamper of FIG. 13 inside an injection molding tool.

DETAILED DESCRIPTION

The invention provides techniques for creating molded substrates having predefined thickness profiles. The particular thickness profile that is needed may depend on media type or format. Indeed, as new media types and formats emerge, the invention can accommodate new desired thickness profiles.

Exemplary media types include optical data storage disks, holographic media having a sandwiched construction in which two substrates sandwich a photopolymer recording material, and flyable rigid disk media such as near field optical or magnetic hard disk media. For optical data storage disks and flyable rigid disk media, improved mechanical flatness may improve media quality. For holographic media, optical flatness of the two substrates may be necessary to achieve an optically parallel media sandwich.

Figure 1:
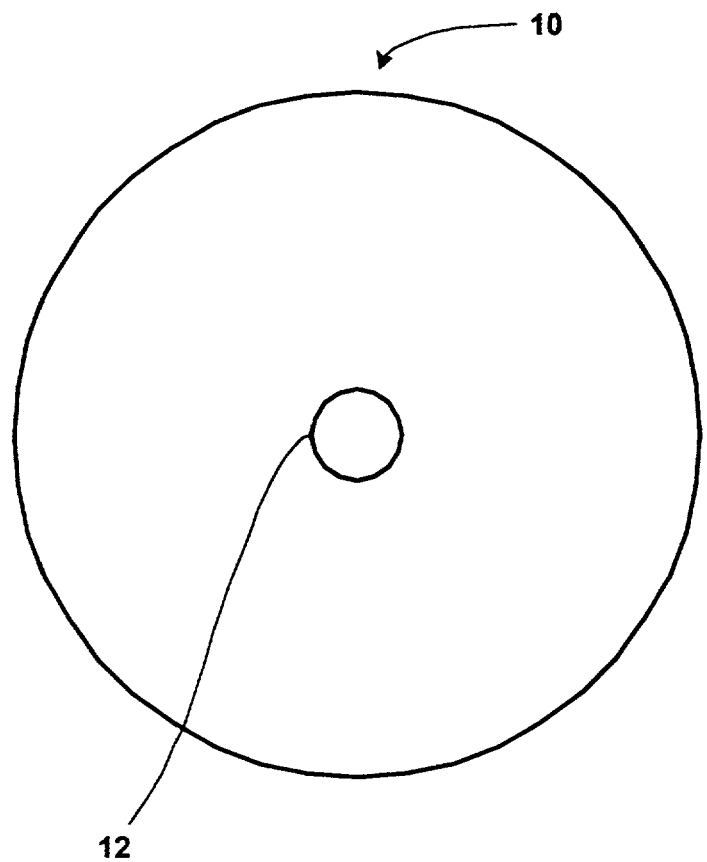
FIGS. 1 and 2 are illustrations of a prior art molded substrates.
Figure 2:
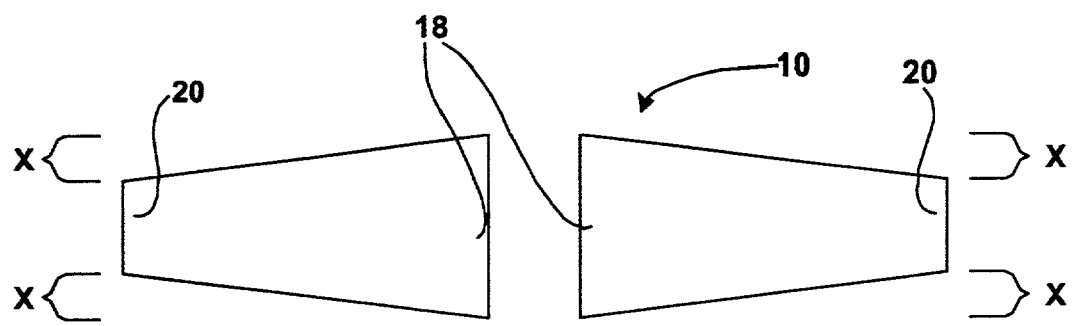

FIGS. 1 and 2 are illustrations of a prior art molded substrates. FIG. 1 is a top view. Prior art substrate 10 is formed from an injection moldable material. For example, polycarbonate is often used to form substrate 10. Prior art substrate 10 includes a center hole 12 for mounting about a spindle motor to rotate the substrate.

FIG. 2 is a cross-sectional side view showing prior art thickness variations that generally exist in prior art molded substrates. For purposes of illustration, the thickness variations shown in FIG. 2 are extremely exaggerated. In general, prior art injection molding tools create disks that exhibit substantially linear thickness variations from the inner most radius 18 to the outermost radius 20. In other words, substrate 10 is thicker at innermost radius 18 than it is at outermost radius 20. In prior art molded substrates, the prior art variation 2X is generally greater than 10 microns. Indeed, experimental measurements have shown that the thickness variations 2X from the inner diameter 18 to the outer diameter 20 of prior art molded substrates is typically between 10 microns and 50 microns.

The thickness variations can be due to several factors including differential cooling of the molded material, temperature variations across the molding tool, differential pressure applied across the molding tool, or mechanical planarity of the tool itself. Whatever the cause, thickness variations are generally undesirable. Although, the variations in substrate thickness in prior art molded substrates have not inhibited the effectiveness of CDs and DVDs, for example, future optical data storage disks may require reduced thickness variations to achieve higher data storage densities.

Another thickness phenomenon in prior art molded substrates is referred to as an edge wedge phenomenon. In particular, an edge wedge refers to cusps (not shown) that are commonly exhibited at the inner and/or outer edges 18, 20 of prior art molded substrates. Edge wedges phenomenons are also related to differential cooling of the molded material. However, edge wedge phenomenons are a separate and distinct problem from the more linear thickness variations as illustrated in prior art disk 10 of FIGS. 1 and 2. The techniques described below may or may not be used in conjunction with other techniques that overcome edge wedge problems.

Prior art molded substrates also exhibit variations in index of refraction across the radial dimension. Prior art substrate 10 generally exhibits an index of refraction near outer diameter 20 that is smaller than the index of refraction near inner diameter 18. Experimental measurements have revealed that the variation in the index of refraction over the radial dimension is substantially linear. The index of refraction near outer diameter 20 is generally less than the index of refraction near the inner diameter 18 by a variation on the order of $10^{-3}$. For this reason, the variation in optical flatness in prior art substrates is greater than 10 microns from inner diameter to outer diameter. Indeed, in prior art molded substrates the variation in the local index of refraction and the variation in cross-sectional thickness compound to result in substrates that have even larger optical flatness variations than the mechanical flatness variations.

Figure 3:
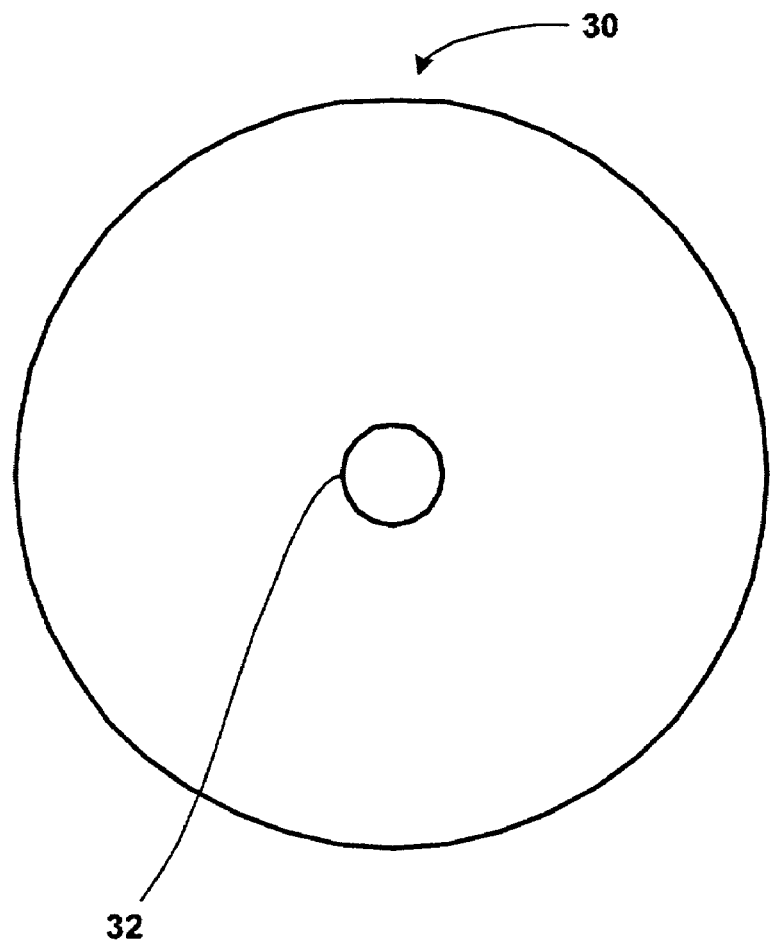
FIGS. 3–6 are illustrations of molded substrates according to the invention.
Figure 4:
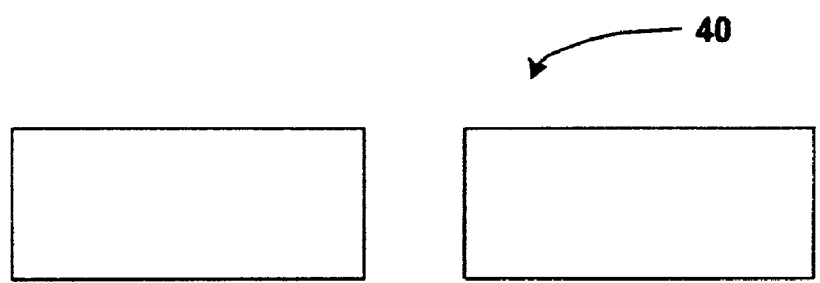
Figure 5:
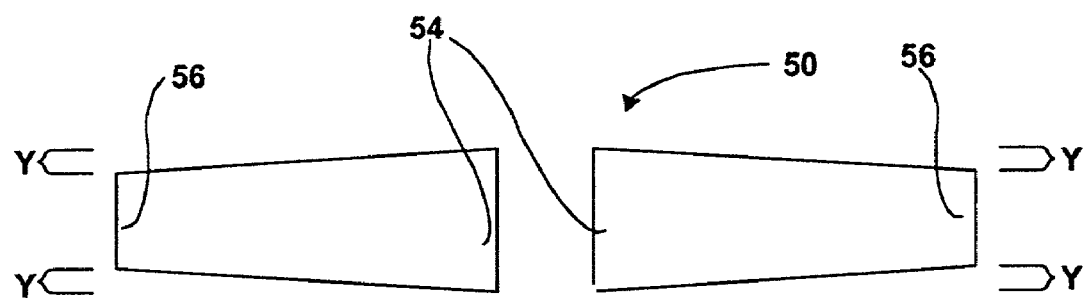
Figure 6:
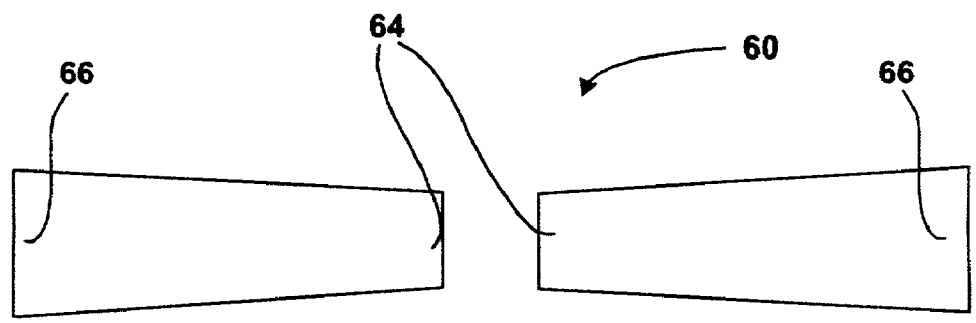

FIGS. 3–6 are illustrations of molded substrates according to the invention. In particular, FIGS. 3–6 illustrate substrates having thickness profiles that exhibit reduced thickness variations compared to the prior art. The substrates in FIGS. 3–6 are comprised of a moldable material, such as polycarbonate. Other suitable moldable materials, including various thermoplastic materials could also be used. The illustrations of the thickness variations shown in FIGS. 5 and 6 are extremely exaggerated.

FIG. 3 is a top view of substrate 30 according to the invention. Substrate 30 may include a center hole 32.

Substrate 30 may represent any of substrates 40, 50 or 60 of FIGS. 4–6 respectively. FIG. 4 is a cross-sectional side view of substrate 40. As shown, substrate 40 has substantially no cross-sectional thickness variation over the radial dimension. For example, the thickness variation illustrated in FIG. 4 may be on the order of one micron or less. The techniques described below can be used to realize such a substrate.

FIG. 5 is a cross-sectional side view of substrate 50. As shown, substrate 50 has a substantially reduced cross-sectional thickness variation over the radial dimension. In particular, the thickness variation between inner diameter 54 of substrate 50 and outer diameter 56, i.e., 2Y, may be less than 10 microns. Indeed, the techniques described below can be used to achieve thickness variations less than 2 microns, or even thickness variations on the order of one micron.

FIG. 6 is a cross sectional view of substrate 60. In one embodiment, FIG. 6 illustrates a substrate that is optically flat. In other words, the local index of refraction multiplied by the cross-sectional thickness is substantially constant at substantially all locations of the recording area of substrate 60. The techniques described below can be used to realize substrates that are optically flat to variations less than 10 microns, less than 2 microns, or even to variations on the order of one micron. Notably, in substrate 60 the cross-sectional thickness at inner diameter 64 is less than the cross-sectional thickness at outer diameter 66. The variation in cross-sectional thickness may be very small, i.e., less than one micron. The variation in cross-sectional thickness can compensate for the variation in index of refraction such that substrate 60 is optically flat to variations less than 10 microns, less than 2 microns, or even less than one micron.

An optically flat substrate will generally not be a mechanically flat substrate if there is a variation in the index of refraction over the radial dimension of the substrate. For this reason, the invention may involve a process of purposefully varying the substrate thickness over the radial dimension such that the substrate is substantially optically flat. In other words, the substrate thickness is purposefully varied such that the local index of refraction multiplied by the cross-sectional thickness is substantially constant at substantially all locations of the recording area of the substrate.

Figure 7:
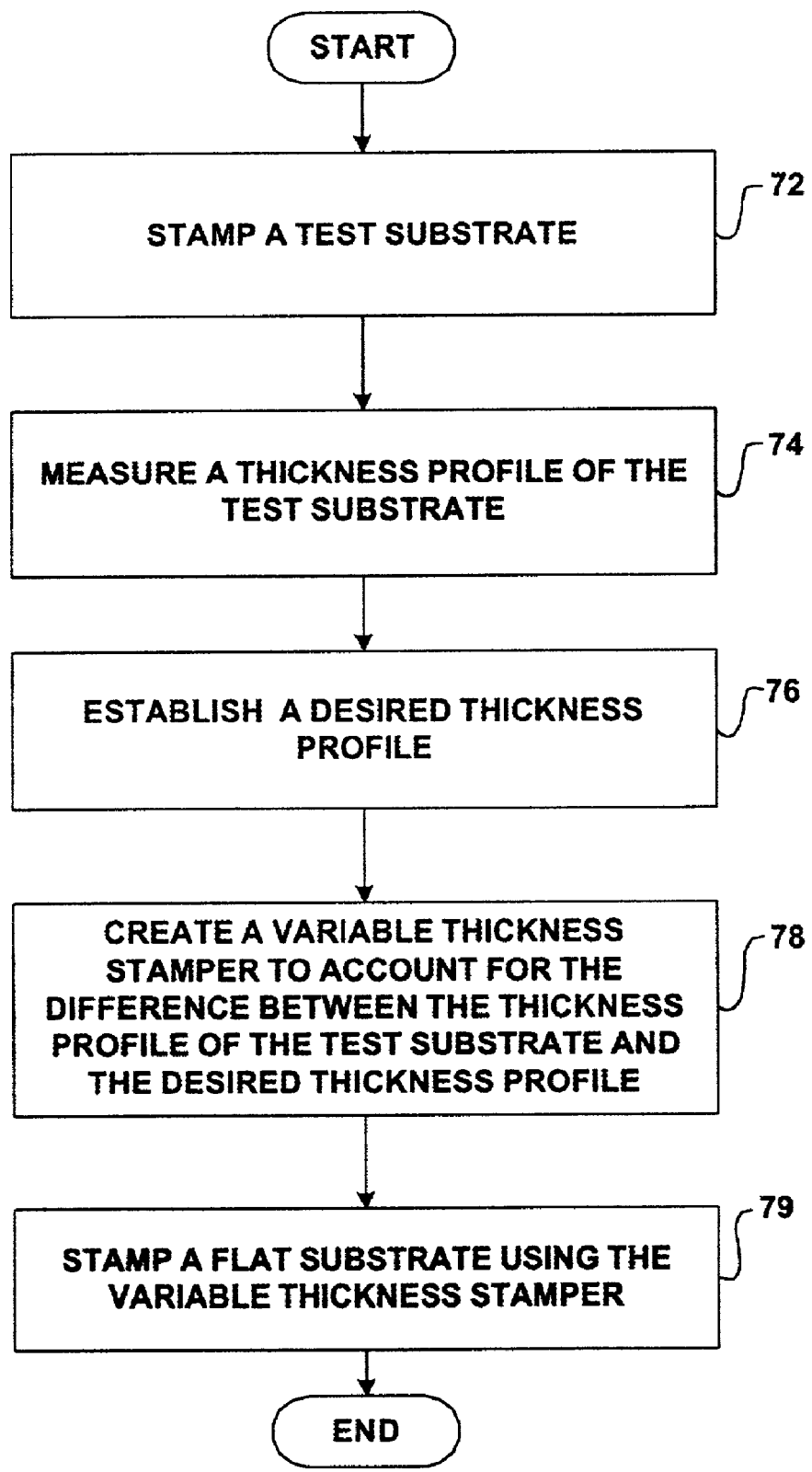
FIGS. 7–9 are flow diagrams according to embodiments of the invention.

FIG. 7 is a flow diagram according to an embodiment of the invention. As shown, a test substrate is stamped (72) using conventional molding tools. The thickness profile of that test substrate is then measured (74). For example, the mechanical thickness profile may be measured by measuring the mechanical thickness variation over a radial dimension of the substrate. Alternatively, the optical thickness of the substrate can be measured across a radial dimension of the substrate using an interferometer. A desired thickness profile can be established (76). For example, the desired thickness profile may be one that yields mechanically flat substrates or one that yields optically flat substrates. Optically flat substrates may exhibit a small thickness variation across the radial dimension of the substrate, provided the index of refraction varies in a commensurate manner.

Once a desired thickness profile has been established (76), a variable thickness stamper is created to have a thickness profile that accounts for the difference between the thickness profile of the test substrate and the desired thickness profile (78). In other words, the variable thickness stamper is created to be thicker in the regions where the difference between the thickness of the test substrate an the desired thickness profile is greater, and thinner in the regions where the difference between the thickness of the test substrate and the desired thickness profile is smaller. In the case where the desired result is mechanically flat substrates, creating a variable thickness stamper comprises creating the stamper to have a thickness profile that varies in a substantially similar manner as the thickness profile of the test substrate. In the case where the desired result is optically flat substrates, the thickness profile of the stamper may account for both thickness variations and variations in the index of refraction across a radial dimension of the substrates. In other words, in the case where the desired result is optically flat substrates, creating a variable thickness stamper comprises creating the stamper to have a thickness profile that varies by even more than the thickness variation of the test substrate.

A flat substrate is then stamped using the variable thickness stamper (79). The flat substrate can be either optically flat or mechanically flat depending on the thickness profile of the stamper. Stamping the flat substrate may comprise inserting the variable thickness stamper into an injection molding tool and injection molding a flat polycarbonate substrate in the injection molding tool. During the injection molding process, the variable thickness stamper flexes to define variations in initial substrate thickness that corresponds inversely to the thickness variation in the variable thickness stamper. However, once the molded polycarbonate material has cooled, the substrate is flat because of the differential cooling of the molded polycarbonate material.

Figure 8:
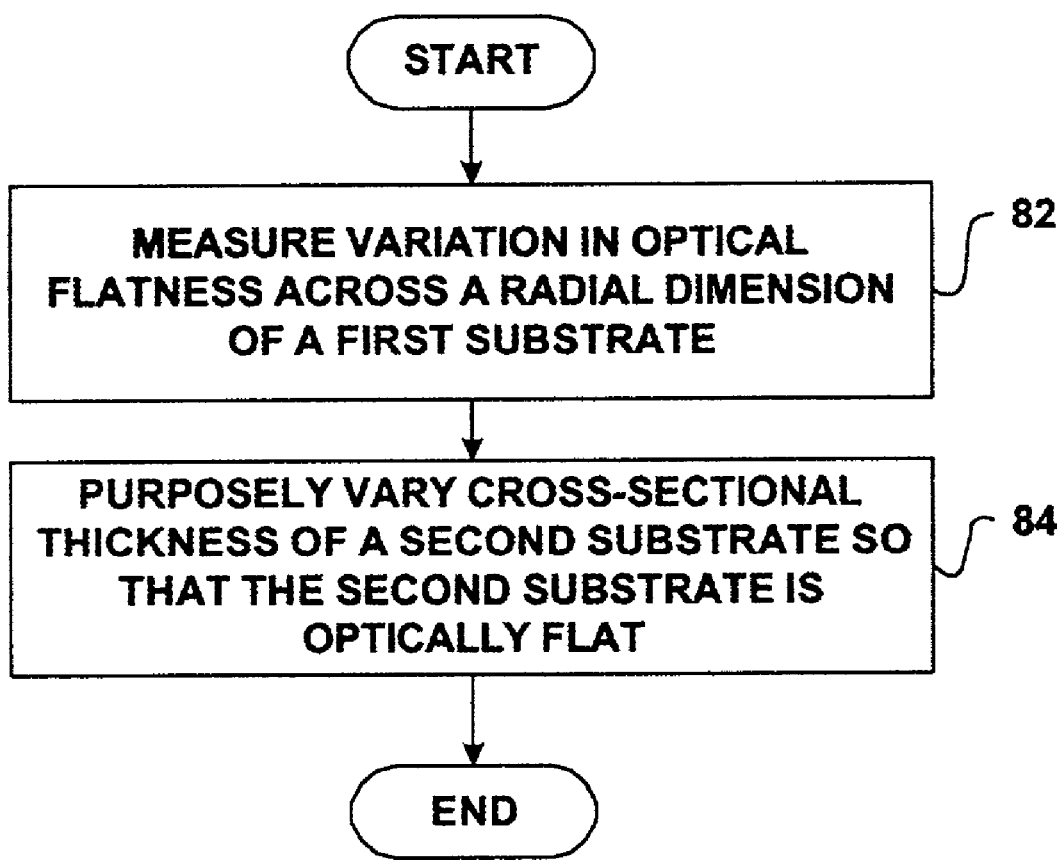

Again, in the case where optical flatness is desired, the substrate may have purposeful variations in thickness to compensate for variations in index of refraction as illustrated in FIG. 6. FIG. 8 is a flow diagram that illustrates in greater detail, a process of creating optically flat substrates. As shown, the variation in optical flatness is measured across a radial dimension of a first substrate, i.e., a test substrate (82). An interferometer can be used to make the measurement. The optical thickness is defined as the index of refraction multiplied by the mechanical thickness. In other words, at any location on the medium:

O=T*I, where
O=cross-sectional optical thickness,
T=cross-sectional mechanical thickness, and
I=local index of refraction.

Thus, if the index of refraction increases across a radial dimension of the substrate, so too does the optical thickness. In addition, if the mechanical thickness increases across a radial dimension of the substrate, the optical thickness increases as well. Experimental measurements have shown that the index of refraction of molded polycarbonate substrates is smaller near the outer diameter. Thus, to achieve optical flatness, the outer diameter of the substrate must be made slightly thicker than the inner diameter, e.g., as illustrated in FIG. 6.

Once the variation in optical flatness of a first substrate has been measured (82), the cross-sectional thickness of a second substrate is purposely varied so that a second substrate is optically flat (84). For example, as described in greater detail below, a variable thickness stamper can be created for use an injection molding tool to purposely vary substrate thickness so as to achieve optical flatness. The optical flatness accounts for both thickness variations and variations in the index of refraction across the radial dimension of substrates. As discussed above, conventional substrates are thicker at smaller radiuses, and have a higher index of refraction at smaller radiuses. Therefore, a substrate that is made to be optically flat may be slightly thinner at small radiuses to account for the variation in index of refraction.

Figure 9:
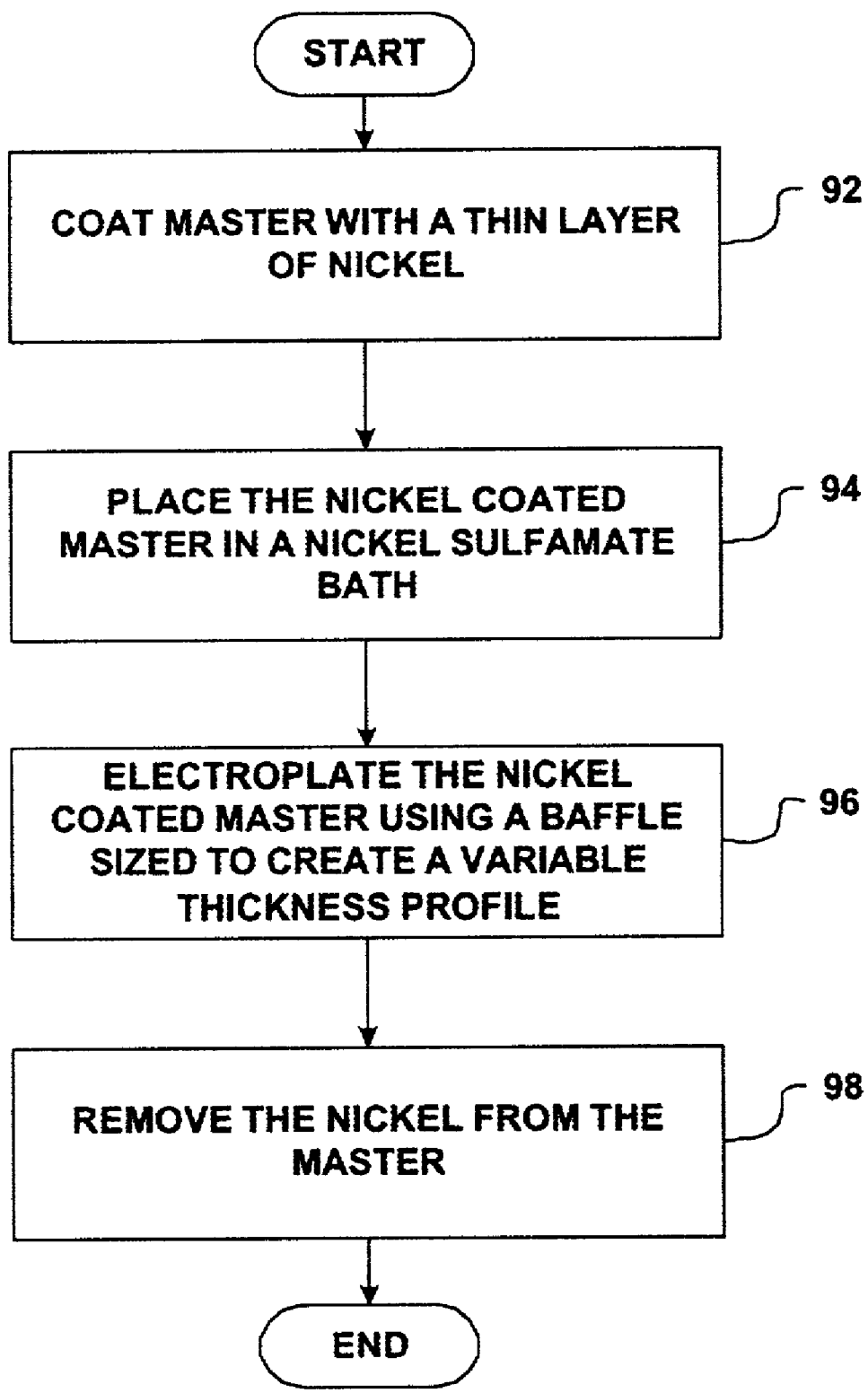

FIG. 9 illustrates a process for creating a variable thickness stamper for use in creation of flat molded substrates.

The process may include an electroplating process. By way of example, FIG. 9 illustrates the process of creating a nickel stamper, although other metals could be used.

As shown, a nickel stamper may be created from a master by first coating the master with a thin layer of nickel (92). The master defines the surface pattern to be embossed on the resultant substrate. In many cases, such as applications for holographic media having a sandwiched construction, the desired substrate may not include surface patterns. In those cases, the master is simply a flat surface. In other cases, however, the master is lithographically etched with a surface relief pattern.

After coating the master with a thin layer of nickel, the nickel coated master (or flat surface) can then be placed in a nickel sulfamate bath (94), where it may be electroplated using a baffle sized to create a variable thickness profile (96). For instance, electroplating (96) may cause a thick layer of nickel to solidify on the nickel coated master. The size and shape of the baffle can be controlled to cause more nickel to be electroplated in particular regions. For example, a baffle having a smaller hole than conventional baffles can be used to cause nickel to solidify on the nickel coated master such that the layer of nickel is thinner near the outer edges. The thick layer of nickel may be bonded to the thin layer of nickel that was coated on the master. Thus, both layers of nickel may collectively become a metal stamper that is removed from the master (98). Again, the stamper may be thicker near an inner diameter because of the use of the baffle sized to create the variable thickness profile. Removing the nickel layers from the master (98), for instance, may destroy the master. If the master includes a photoresist layer encoded with a surface pattern, excess photoresist may be removed from the nickel through the application of a stripper chemical.

Figure 10:
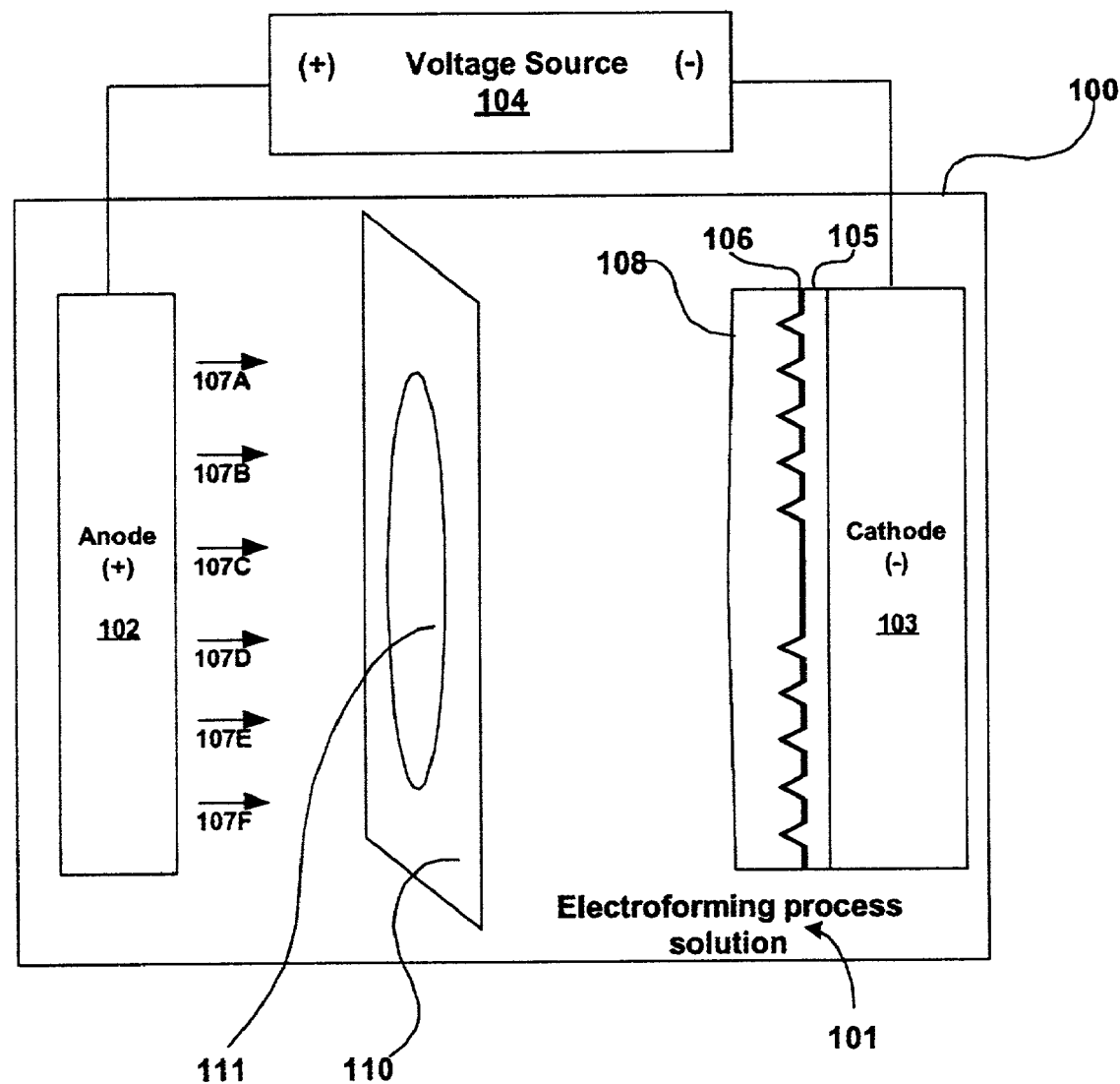
FIG. 10 is a block diagram illustrating an electroplating process according to the invention.

FIG. 10 is a block diagram illustrating the electroplating process in more detail. In the exemplary embodiment shown, the electroplating process makes use of an electroforming chamber 100, an electroforming process solution 101, one or more anodes 102, one or more cathodes 103, and a voltage source 104. Voltage source 104 has a positive terminal that is electrically coupled to anode 102 and a negative terminal that is electrically coupled to cathode 103. The nickel-coated master 105 may be etched with grooves (as shown) or may simply comprise a flat surface (not shown). The nickel-coated master 105 is mechanically and electrically coupled to cathode 103, and as such, may become part of cathode 103 during the electroplating process. Cathode 103 and anode 102 are placed within electroforming chamber 100 so that they are submerged in electroforming solution 101.

For instance, anode 102 may be a nickel anode and cathode 103 may be made of copper. Electroplating process solution 101, for instance, may be a nickel sulfamate solution. A plurality of anodes in the form of nickel anode baskets, for instance, may be placed within the nickel sulfamate electroforming solution (only one anode 102 shown). In operation, cathode 103 may be rotated during the electroforming process. Voltage source 104 can be activated, and upon activation, nickel ions, indicated at 107A–107F may flow from anode 102 to cathode 103.

Everything on cathode 103 may be masked with non-metallic material, except for a thin layer of nickel coated on the surface of master 105 (indicated at 106). During the electroplating process, a nickel structural layer 108 is plated onto the nickel coated surface 106 of master 105. Baffle 110 may control the thickness of nickel structural layer 108. The size of the hole 111 in baffle 110 can be controlled during the electroplating process such that more nickel is plated near the center of nickel structural layer 108. A plurality of baffles may be used in an experimental process to determine the baffle that will yield the desired variation in the thickness of nickel structural layer 108.

In one example, the size of the hole 111 in baffle 110 is decreased in 2 millimeter increments. In other words, a first baffle is inserted into electroforming chamber 100 and the electroplating process is performed. After the process is completed, the thickness profile of the resultant stamper can be measured. If the resultant stamper has the correct thickness profile, it can be used to create the desired substrate. If the thickness variation of the resultant stamper is too large, a new stamper can be made using a baffle with a hole sized 2 millimeters larger than that of first baffle. Similarly, if the thickness variation of the resultant stamper is too small, a new stamper can be made using a baffle with a hole sized 2 millimeters smaller than that of first baffle. The electroforming process is then started again and again until a stamper having the desired thickness profile is realized.

Each electroplating process can be started with a slow current so that nickel is built up to a desired thickness on the nickel plated surface 106, e.g., a thickness on the order of approximately 300 microns with the desired thickness variation. When the plating process is complete, the exposed surface of the nickel structural layer 108 can be polished. During the electroplating process, the thin layer of nickel 106 originally coated on the master 105 may become part of the nickel structural layer 108 to form a metal stamper.

EXAMPLE

A 210 millimeter diameter stamper can be electroplated using a initial baffle with a hole approximately 170 millimeters in diameter. The resultant stamper may have a substantially uniform cross-sectional profile. Baffles having holes decreasing by approximately 2 millimeter increments can then be inserted in place of the preceding baffle to create variable thickness stampers having larger and larger thickness variations over a radial dimension. For example, the hole size of the baffle can be decreased from 170 millimeters to 168 millimeters to 166 millimeters to 165 millimeters. A 210 millimeter diameter stamper electroplated using a baffle with a hole approximately 165 millimeters in diameter can yield a stamper having a cross-sectional thickness variation that varies substantially linearly over a radial dimension of the stamper by approximately 10 microns.

Figure 11:
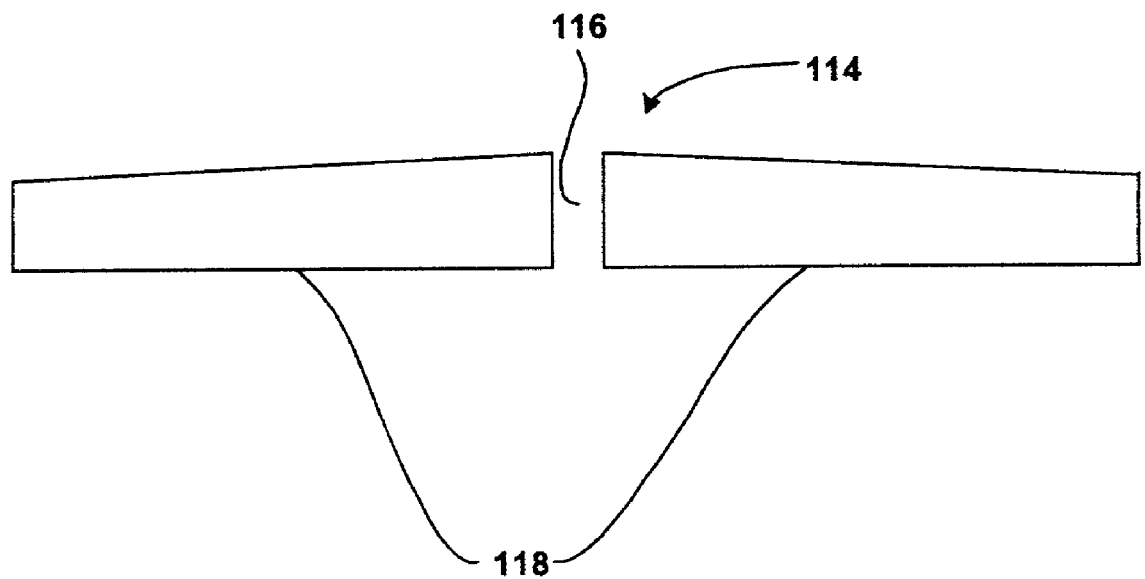
FIG. 11 is a cross-sectional side view of a variable thickness stamper according to the invention.

Once the desired stamper has been created, the stamper can be used to mold replica disks that have improved flatness. FIG. 11 is a cross-sectional side view of a variable thickness stamper 114 according to the invention. The variable thickness stamper 114 may include a center hole that is die punched after the electroplating process to match the specifications of an injection molding tool. Importantly, the stamper has a non-uniform cross-sectional thickness profile. The stamper can flex during the stamping process to transfer the non-uniform cross-sectional profile to molded substrates prior to cooling. Then, during the cooling process, differential cooling can cause the molded substrates to become flat. In other words, the non-uniform cross-sectional profile of stamper 114 can compensate for differentially cooling in the thermoplastic to yield substrates having improved flatness. The flexure and shape of the stamper can be made proportional to the thickness variation caused by differential cooling. The stamping surface 118 of stamper 114 may include surface patterns originally encoded on a master, or may be substantially smooth. In the latter case, a master having a substantially smooth surface may be used in the electroplating process.

Figure 12:
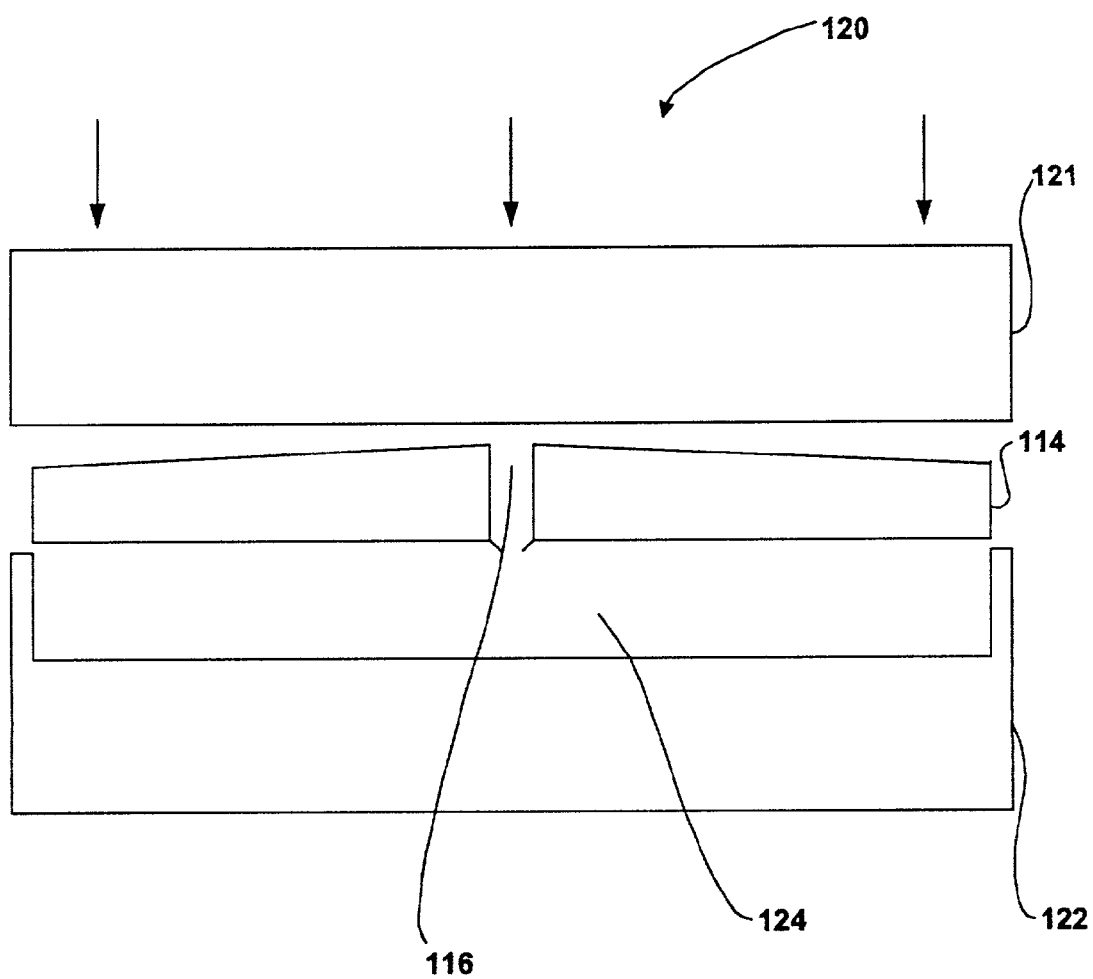
FIG. 12 is a cross-sectional side view of the variable thickness stamper of FIG. 11 inside an injection molding tool.

FIG. 12 is a cross-sectional side view of variable thickness stamper 114 inside an injection molding tool 120. The injection molding tool 120 includes first and second mirror blocks 121 and 122. To create a molded substrate, an injection moldable material, such as a hot thermoplastic resin, is injected into cavity 124 and mirror block 121 presses variable thickness stamper 114 downward against the injection moldable material. For example, the injection moldable material may be injected through hole 116 of variable thickness stamper 114, possibly through a hole (not shown) in mirror block 121. As mirror block 121 presses downward on variable thickness stamper 114, variable thickness stamper 114 flexes such that the molten injection molded material has an initial inner diameter smaller than its outer diameter. Differential cooling, however, causes the resultant substrate to become substantially flat, i.e., to have a substantially uniform thickness. In some cases, optical flatness is achieved and in other cases mechanical flatness is achieved, depending on the desired substrate target and commensurate stamper design.

For nickel stampers having a thickness on the order of 300 microns, the amount of flexing that occurs when mirror block 121 presses against variable thickness stamper 114 is an amount sufficient to pass an approximate inverse profile of the stamper into the moldable material. Of course, if other materials other than nickel are used, or if thicker stampers are created, the stampers may not flex as much. In those cases, the thickness variations in the stampers may be larger than the thickness variation passed on to the moldable material. These variables, however, can be easily accounted for to ultimately realize substrates having the desired thickness profile.

The realization of substrates having improved thickness profiles according to the invention can improve media quality for a variety of different media formats including conventional optical data storage disks, flyable rigid disk media and holographic media having a sandwiched construction. Optically flat substrates, in particular, may be necessary to realize effective holographic media. If the substrates are not optically flat, the ability to reconstruct distortion free data beams used for readout of holographic bit maps can be compromised. Indeed, in some cases, non-optically flat substrates can cause holographic media to be ineffective. In short, substrates that are optically flat to within the ranges described herein can be necessary to realize holographic media having a sandwiched construction.

The invention also provides greater design freedoms. Although the techniques are described herein as realizing substrates having improved flatness, the techniques could also be used to realize substrates having any thickness profile. If future media require substrates having any non-conventional thickness profile, the invention may be used to realize the desired substrate.

The invention can be used to realize injection molded substrates that are sufficiently flat at substantially all locations of a recording area on the surface of a medium. Injection molded substrates provide a low cost alternative to other types of substrates, such as glass or aluminum substrates.

In some cases, substantially all locations of the recording area on the surface of the medium does not include the innermost and/or outermost two millimeters of the medium. In these regions, a separate more drastic thickness phenomenon, referred to as "edge wedge" can cause relatively drastic variations in the thickness of a medium. Various aspects of the invention may be used without being concerned with edge wedge problems. Thus, the invention may comprise substrates that have substantially no thickness variation (either mechanical or optical) at substantially all locations on the recording area of the medium surface, yet still exhibit edge wedge thickness variations at the outer or inner most 2 millimeters of the substrate.

In other cases, however, even these edge wedge problems are overcome in addition to the more linear thickness variations discussed above. The teaching below can be used to overcome edge wedge problems.

In one example, edge wedge thickness variations exhibited at the outermost 2 radial millimeters of an injection molded disk, are eliminated by injection molding oversized optical disks. The desired size of optical disk can then be die punched or otherwise cut from the oversized disk to yield an optical disk that does not exhibit edge wedge problems. Moreover, using the teaching above during the fabrication process of the oversized disk can yield an optical disk that is either mechanically flat to within less than 10 microns of variation or optically flat to within less than 10 microns of variation.

In a similar manner, the center hole may be initially undersized (or eliminated altogether) during the injection molding process. Then, after the oversized disk with an undersized center hole has cooled, the correct sized center hole can be die punched or otherwise removed to overcome edge wedge problems near the undersized center hole of the molded substrate.

In another example, edge wedge thickness variations are addressed during the stamping process. For example, a variable thickness stamper could further include anti-edge-wedge features to ensure that the resultant substrate has a substantially uniform thickness profile at substantially all locations including the inner most or outer most 2 millimeters of the substrate.

Figure 13:
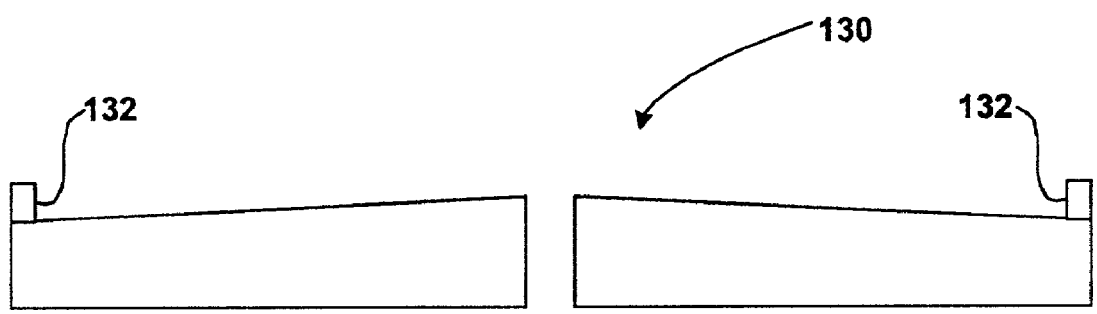
FIG. 13 is a cross-sectional side view of another variable thickness stamper that includes features that compensate for edge wedge problems.

FIG. 13 is a cross-sectional side view of another variable thickness stamper that includes features that compensate for edge wedge problems. FIG. 14 is a cross-sectional side view of the variable thickness stamper of FIG. 13 inside an injection molding tool. Variable thickness stamper 130 in FIGS. 13 and 14 is substantially similar to variable thickness stamper 114 illustrated in FIGS. 11 and 12. However, variable thickness stamper 130 includes lip 132 that can compensate for thickness variations in molded substrates at the outermost two millimeters of the substrates.

Lip 132 can be added to the outer perimeter of variable thickness stamper 130 during the electroplating process. For example, variable thickness stamper 130 can be plated to a thickness of approximately 280 microns as described above using a baffle with a hole sized to provide variable thickness in variable thickness stamper 130. Stamper 130 can then be removed from the electroplating bath and a mask can be adhered to the plated nickel on stamper 130. After the mask is adhered to the plated nickel, stamper 130 can be reinserted into the electroplating path and the non-masked area can be plated with approximately an additional 15 microns of nickel, thus producing lip 132 around the outside perimeter of stamper 130.

FIG. 14 illustrates variable thickness stamper 130 of FIG. 13 inside an injection molding tool 140. The injection molding tool 140 includes first and second mirror blocks 141 and 142. To create a molded substrate an injection moldable material is injected into cavity 144 and mirror block 141 presses variable thickness stamper 130 downward against the injection moldable material. For example, the injection moldable material may be injected through hole 146 of variable thickness stamper 130, possibly through a hole (not shown) in mirror block 141. As mirror block 141 presses downward on variable thickness stamper 130, variable thickness stamper 130 flexes such that the molten injection moldable material has an initial inner diameter smaller than its outer diameter. In addition, a larger flexing occurs because of the presence of lip 132 to counter the edge wedge thickness variations. The flexing may form an arc shape within cavity 144 near the outermost region of the cavity. Differential cooling, however, causes the resultant substrate to become flat at all locations on the substrate, including the outermost 2 millimeters. In some cases, optical flatness is achieved, and in other cases, mechanical flatness is achieved, depending on the desired substrate.

In still other cases, lip 132 is made substantially large so as to overcompensate for edge wedge thickness variations. For example, holographic substrates may need to be optically flat at substantially all locations on the recording area of the substrate, but not at the outermost two radial millimeters. However, edge wedge problems may undermine holographic media construction, nevertheless, because edge wedge cusps may undermine the ability to press the substrates together to sandwich a photopolymer material such that the photopolymer material is substantially uniform in thickness between the substrates. If the thickness at the outermost two radial millimeters is thinner than the rest of the substrate, however, the substrates could still be pressed together such that the photopolymer material between the substrates achieves a substantially uniform thickness. For this reason, edge wedge problems can be overcome, in some cases, even if the presence of lip 132 overcompensates for edge wedge thickness variations.

Various embodiments of the invention have been described. For instance, various processes have been described that facilitate the creation of substrates having improved flatness. The substrates may be created to be optically flat or mechanically flat, depending on the ultimate use of the substrate. Nevertheless, various modifications may be made without departing from the spirit and scope of the invention. For example, the invention could be used to create substrates having any desired thickness profile including variable thickness substrate profiles. Indeed, as new data storage media formats emerge, the need for non-traditional media thickness profiles could easily be accommodated in accordance with the invention.

In addition, optically flat substrates, mechanically flat substrates, or substrates having any desired thickness profile according to the invention may be created in other ways. For example, rather than creating a variable thickness stamper, a variable shaped surface may be created as a face of a mirror block that presses against a stamper in an injection mold. In that case, the variable shaped surface of the mirror block may cause a conventional non-variable shaped stamper to flex within an injection mold to compensate for differential cooling of the moldable material. Accordingly, other embodiments are within the scope of the following claims.

What is claimed is:

1. A molded substrate, wherein an index of refraction of the molded substrate varies radially over the molded substrate, and wherein a cross-sectional thickness of the molded substrate varies radially over the molded substrate such that at substantially all locations on the recording area of the molded substrate a local index of refraction multiplied by the cross-sectional thickness is substantially constant to within a variation less than 10 microns.

2. The molded substrate of claim 1, wherein at substantially all locations on the recording area of the molded substrate the local index of refraction multiplied by the cross-sectional thickness of the substrate is constant to within a variation less than 2 microns.

3. The molded substrate of claim 1, wherein at substantially all locations on the recording area of the molded substrate the local index of refraction multiplied by the cross-sectional thickness of the substrate is constant to within a variation on the order of 1 micron.

4. The molded substrate of claim 1, wherein the substrate is a substrate for use in a sandwiched construction holographic data storage medium.

5. The molded substrate of claim 1, wherein substantially all locations on the recording area of the molded substrate do not include the innermost and outermost two radial millimeters of the molded substrate.

6. The molded substrate of claim 1, wherein substantially all locations on the recording area of the molded substrate include the innermost and outermost two radial millimeters of the molded substrate.

7. The molded substrate of claim 1, wherein the molded substrate is formed to define an optical thickness variation less than 10 microns via an injection molding process that includes the use of a variable thickness stamper having a thickness profile that varies substantially linearly over a radial dimension of the stamper and causes the stamper to flex within an injection molding tool to compensate for substantially linear thickness variation across a radial dimension of a molded substrate molded within the injection molding tool.

* * * * *